United States Patent
Rune (10) Patent No.: US 6,697,625 B1
(45) Date of Patent: Feb. 24, 2004

(54) METHOD IN A COMMUNICATION NETWORK

(75) Inventor: Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 389 days.

(21) Appl. No.: 09/712,720

(22) Filed: Nov. 14, 2000

(30) Foreign Application Priority Data

Nov. 19, 1999 (SE) ................................................ 9904189

(51) Int. Cl.$^7$ ................................................ H04Q 7/20
(52) U.S. Cl. ..................... 455/446; 455/414; 455/422.1
(58) Field of Search ................................. 455/946, 403, 455/414, 418, 419, 422, 433, 435, 456, 550, 551, 422.1, 423, 424, 432.3, 432.1

(56) References Cited

U.S. PATENT DOCUMENTS

| | | | | | |
|---|---|---|---|---|---|
| 5,212,822 | A | * | 5/1993 | Fukumine et al. | 455/435 |
| 5,361,396 | A | * | 11/1994 | Onoe et al. | 455/435 |
| 5,548,816 | A | * | 8/1996 | DeVaney | 455/456 |
| 6,039,624 | A | * | 3/2000 | Holmes | 455/403 |
| 6,195,550 | B1 | * | 2/2001 | Sollee et al. | 455/432 |
| 6,229,792 | B1 | * | 5/2001 | Anderson et al. | 370/280 |
| 6,266,527 | B1 | * | 7/2001 | Mintz | 455/423 |
| 6,275,706 | B1 | * | 8/2001 | Rune | 455/456 |

FOREIGN PATENT DOCUMENTS

| | | |
|---|---|---|
| WO | WO 98/46032 | 10/1998 |
| WO | WO 99/40751 | 8/1999 |

OTHER PUBLICATIONS

"Mobility and Security Management", *The GSM System*, pp. 432–498, XP–002129579.

* cited by examiner

Primary Examiner—Congvan Tran (57) ABSTRACT

The present invention relates to a method for assigning temporary identities to terminals connected to a communication network forming a geographic network service area with a number of location areas (fixed or dynamically customised), wherein the network service area is divided into a number of geographical part-areas, uniqueness areas, where each uniqueness area is controlled by a network node, mobile serving node MSN, responsible for a number of cells. A terminal registering in a uniqueness area is assigned a temporary identity, which is unique for that area, by the MSN responsible for that area, wherein the division into uniqueness areas is created independently and without relation to the location areas of the network.

21 Claims, 4 Drawing Sheets

METHOD IN A COMMUNICATION NETWORK

TECHNICAL FIELD

The present invention relates to a method in a communication network for handling temporary identities assigned to terminals connected to the network.

BACKGROUND OF THE INVENTION

In present cellular systems, a "subscriber identity confidentiality feature" is often used for preventing the movements of a subscriber within a communication network to be traced by listening to the signalling over the radio interface. The feature consists of assigning a temporary identity to the subscriber, which identity is changed as often as considered necessary.

It is stated above that the temporary identity is assigned to and associated with the subscriber. However, in many cellular systems the subscription and the terminal are tied together in a way that makes it pointless to make the distinction between the subscriber and the terminal in this context. Hence, in such systems you may as well say that the temporary identity is assigned to and associated with the terminal. It is also possible in a cellular system to have a terminal identity (and a temporary identity replacing this terminal identity) which is completely separated from the subscription. Such a terminal identity may e. g. be used for paging the terminal and for other procedures dealing with setting up a radio bearer and an association between the terminal and the radio access network. In addition, the word "user" is often used instead of "subscriber" in documents describing procedures in a cellular network. The temporary identities dealt with in this document could be of any of the above three types (i. e. associated with the subscriber (or user), the subscriber and the terminal, or only the terminal). In the previous paragraph the word "subscriber" is used, but in the rest of the document the word-"terminal" is consistently used, since this word fits best into a technical description. However, the conclusion of the above is that in all cases the words "subscriber" or "user" can replace the word "terminal" without changing the applicability of the present invention.

In present systems the temporary identity is only locally unique within a single location area, where a location area is defined as an area within which the terminal or subscriber is able to move around without informing the network of its location. The location areas are used by the network to keep track of the location of a terminal/subscriber. When the terminal is to be contacted by the network, the terminal is normally paged in all cells in the location area.

The local uniqueness allows the temporary identity to be kept short saving radio resources and allows the temporary identities to be locally assigned without co-ordination with the rest of the network. The temporary identity is assigned by a mobile serving node, MSN, responsible for the location area within which the temporary identity is locally unique. A mobile serving node, MSN, is in this context defined as a network node responsible for a certain number of cells in the network creating location areas, and this also implies that a location area may include cells that are controlled by more than one controlling node in the network. Since these controlling nodes may be different in different cellular systems, they will therefore be referred to with this general term Mobile Serving Node, MSN.

In present systems where the subscriber identity confidentiality feature is used a location area can not include cells that are controlled by more than one MSN. Hence, when used in the location area where it was assigned the temporary identity is recognised and translated to the permanent subscriber identity by the responsible MSN. When the temporary identity is used outside the location area where it was assigned, it has to be accompanied by an additional identifier, preferably the location area identity of the location area where the temporary identity was assigned, in order to make it unique and translatable. If the MSN receiving the temporary identity is another than the one that assigned the temporary identity, the accompanying identifier, for example the above mentioned location area identity, can be used to obtain the address of the MSN that can translate the temporary identity to the real subscriber identity.

In most instances, these mechanisms work smoothly since the location area identity is broadcast in all cells, thereby making it possible for the mobile terminal to know when it has entered another location area. However, this also means a lot of signalling in the network consuming precious radio resources.

Temporary identities may also be used if dynamical, customised location areas are used in a network instead of the conventional geographically fixed location areas. One type of dynamical location areas may be location areas created by collecting information regarding the long term and/or short-term historical movements of a terminal. The cells broadcast geographical coordinates, which are used for creating the specific location areas for specific terminals. The location areas thus created are disconnected from the geographical division of the network by the cells. The size or the kind of dynamical location areas may also be dependent on the kind of traffic between the terminal and the network. The general idea behind these dynamical location areas is to minimise the radio resource consumption caused by paging, location updating and periodic registration of a terminal and to distribute the load caused by location updating more evenly between the cells in the network.

Also for this type of location area scheme it has to be possible to identify the MSN that assigned the temporary identity. Even when the permanent subscriber identity is used in conjunction with these location area schemes it has to be possible to identify the MSN used at the previous location update when a location update is performed in a new MSN. The reason for this is that the location area scheme requires that the mobility management context or at least the data associated with the definition of the customised location area is transferred from the previous to the new MSN when the terminal accesses the network in a cell which is controlled by a new MSN. A way to avoid this data transfer between the MSN's is to send the relevant data (if any) from the MSN to a central database node, for example a Home Location Register (HLR). The necessary data can then be transferred from the HLR to the new MSN at location update in this new MSN. Henceforth, for the simplicity, the possible involvement of a HLR (or similar database node) will be omitted in the description. However, in the above mentioned location area scheme no location area identifiers are broadcast in the cells, only the geographical coordinates of the cells. In addition a location area may well include cells that are controlled by more than one MSN.

In this context, this gives rise to a number of problems/questions:

How should the mobile terminal be identified, when being paged in or when accessing the network? This may be critical when the current cell is not a cell controlled by the MSN that assigned the temporary identity and the temporary identity is only unique in one MSN. Another terminal may have been assigned the same temporary identity by the MSN in control of the current cell.

Should the terminal be made aware of when the previous MSN has to be identified and when consequently the terminal is outside the range of the local uniqueness of its current temporary identity, if a temporary identity is used?

How should the previous MSN be identified, i e the MSN where the data associated with the definition of the previous location area is stored, which may (most likely) or may not be the same MSN that assigned the temporary identity, if a temporary identity is used?

BRIEF DESCRIPTION OF THE INVENTION

The aim of the present invention is to provide a system with areas within which temporary identities are unique and which areas are without relation to the location areas of a network. The aim is also that within each area, hereafter named uniqueness area, a terminal is provided with a unique temporary identity unique for that specific area. This is obtained with a method for a communication network comprising base-stations and cells forming a geographic service area containing a number of location areas, either geographically fixed location areas or dynamical location areas. The network service area is divided into a number of geographical part-areas, uniqueness areas, which are created and without relation to the location areas.

The uniqueness areas are created so as to fully cover the network service area but not overlapping each other. The uniqueness areas are created from the geographic coordinates broadcast from the cells and geometric definitions of each uniqueness area, e g geometrical shapes. Further, each uniqueness area is provided with an identity, uniqueness area identity, which is unique within the network.

Preferably each uniqueness area is controlled by a single MSN. All MSN's in the network must know all MSN's responsible for each uniqueness area.

The merits of the invention are that it uncouples the area of local uniqueness for the temporary identity from the network structure. This means that the uniqueness areas can be based on other criteria, like for example attempting to have on average the same number of users in each area. Thus, location areas and temporary uniqueness areas are not tied to each other. Having uniqueness areas without relation to the location areas is necessary when the customised (i.e. a unique location area for each terminal), dynamic location areas are used.

The invention also allows a great flexibility in the uniqueness area definitions and easy redefinition. By using the geographical information from the cells and geometric definitions, uniqueness areas of almost arbitrary shape can be made. Because this information is provided to the terminal it can keep track of when it enters a new uniqueness area, thus keeping precious radio traffic as low as possible.

In conjunction with dynamical location area schemes, the invention solves the problem of identification of mobile terminals and also the retrieval of the mobility management context at location: update.

These and other aspects of, and merits with, the invention will become apparent from the following detailed description and the drawings.

BRIEF DESCRIPTION OF THE DRAWINGS

In the following detailed description of the invention reference will be made to the accompanying drawings, of which

DETAILED DESCRIPTION OF THE INVENTION

The present invention is aimed for use in a communication network, where the communication network comprises base-stations and cells forming a geographic network service area with a number of location areas. The invention is directed at assigning temporary identities to terminals connected to the communication network.

Figure 1:
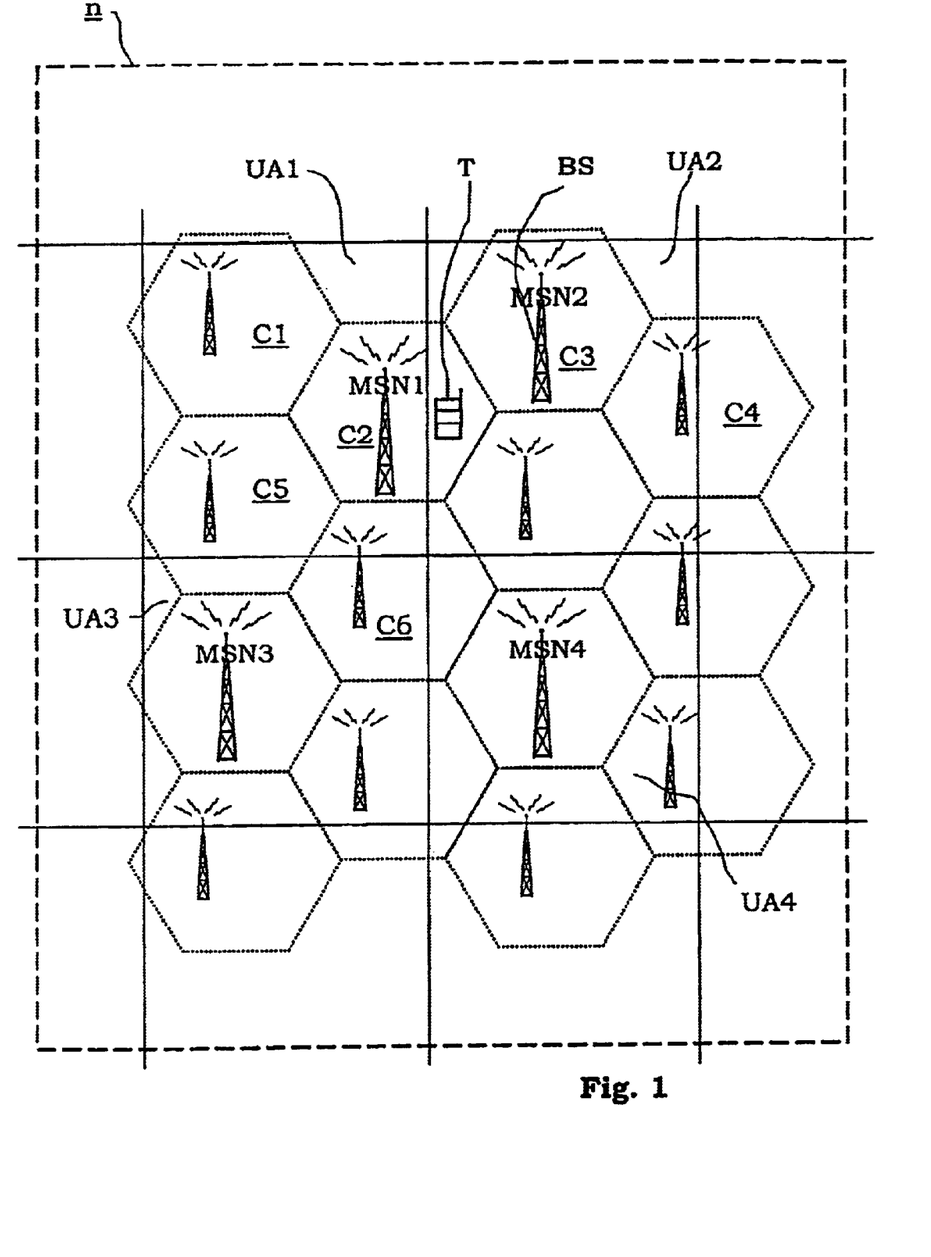
FIG. 1 is a schematic view of a communication network comprising terminals, base stations and cells according to the invention.

In one preferred embodiment use is made of the geographical coordinates that are broadcast from the cells of the network. FIG. 1 shows a part of a communication network n with a number of base-stations BS with corresponding cells C. The network further includes Mobile Serving Nodes, MSN, that are responsible for a number of cells in the network.

The network service area is divided into a number of part-areas, hereafter named uniqueness areas UA, where a single MSN is responsible for each uniqueness area. In this context it is to be noted that not all MSN's in the network have to be responsible for a uniqueness area. Each uniqueness area is created from the geographical coordinates broadcast from the cells. Further, a geometric definition of the uniqueness areas has to be established in order to define the boundaries of the uniqueness areas. Each MSN responsible for a uniqueness area is provided with data information, via an operation and maintenance interface during operation, or during configuration when the MSN is installed, in order for it to recognise the geographical and geometrical description of the definition of its uniqueness area broadcast to the terminal. When the uniqueness areas are created, each uniqueness area is provided with an identity, hereafter named uniqueness area identity, which is unique in the network.

It might be an advantage if each MSN is provided with data information for all uniqueness areas in which it has cells that the MSN controls. This would become necessary if each MSN shall be able to generate and broadcast such information itself. If each MSN has the necessary information stored, unnecessary repeated transfers of these geometrical/geographical data between MSN's are avoided. If not, then this MSN has to receive an acceptance from the MSN responsible for the actual uniqueness area. On the other hand this MSN has to be contacted anyway in order for a temporary identity to be allocated.

Thus, the geographical and geometrical information defines the position and the shape and size of each uniqueness area. In this context it is important to note that the uniqueness areas must cover the whole service area but not overlap each other. This puts constraints on how arbitrary the shapes of the areas can be. The simpler the shape the simpler it is to define it which means less data to describe it.

Figure 2A:
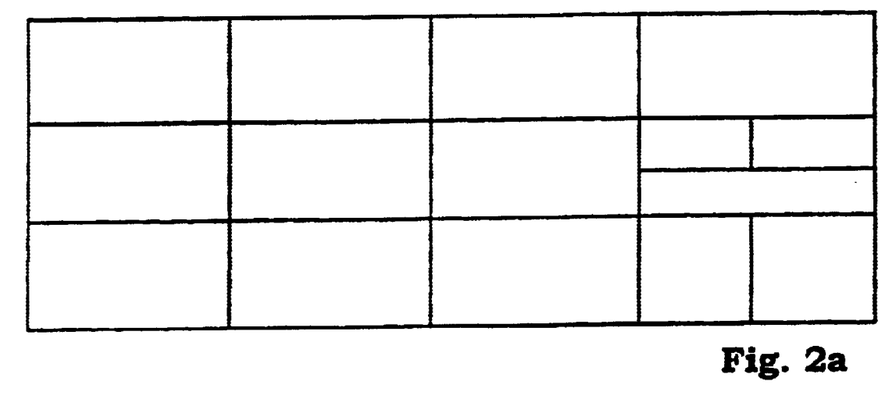
FIG. 2 shows different shapes of uniqueness areas according to the invention.
Figure 2B:
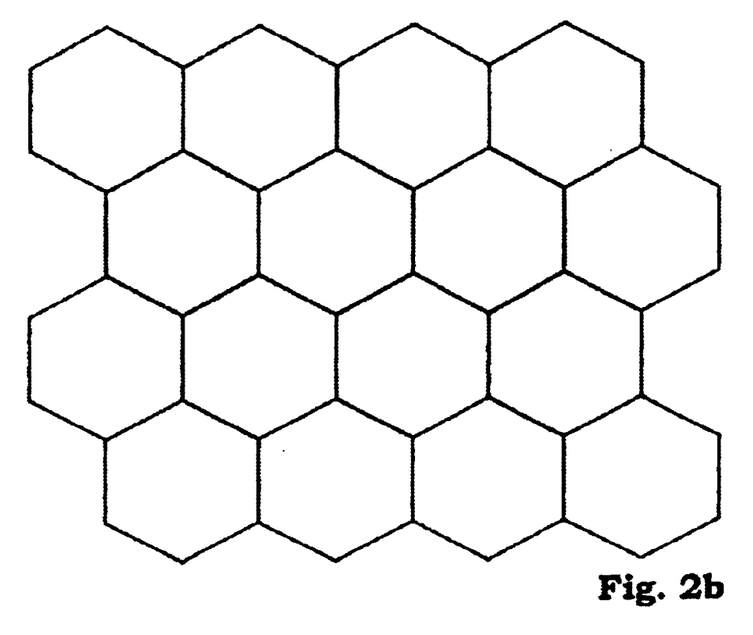
Figure 2C:
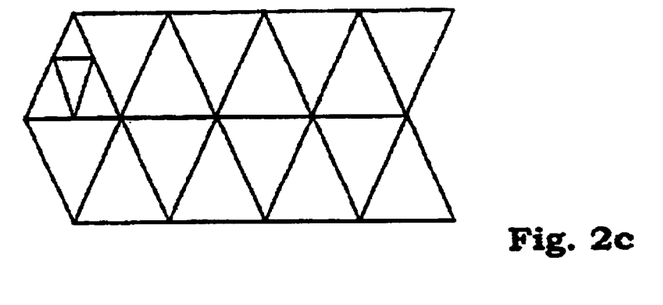

Shapes that are fully covering but not overlapping are for example rectangles, hexagons and symmetric triangles, see FIG. 2. A rectangle can be defined by specifying three points, or two points if the rectangle is always directed in the same direction, for example north. The definition of a hexagon also requires three points or two with a fixed direction. A symmetrical triangle may be defined using only two points if the angles or the direction is fixed.

Figure 3:
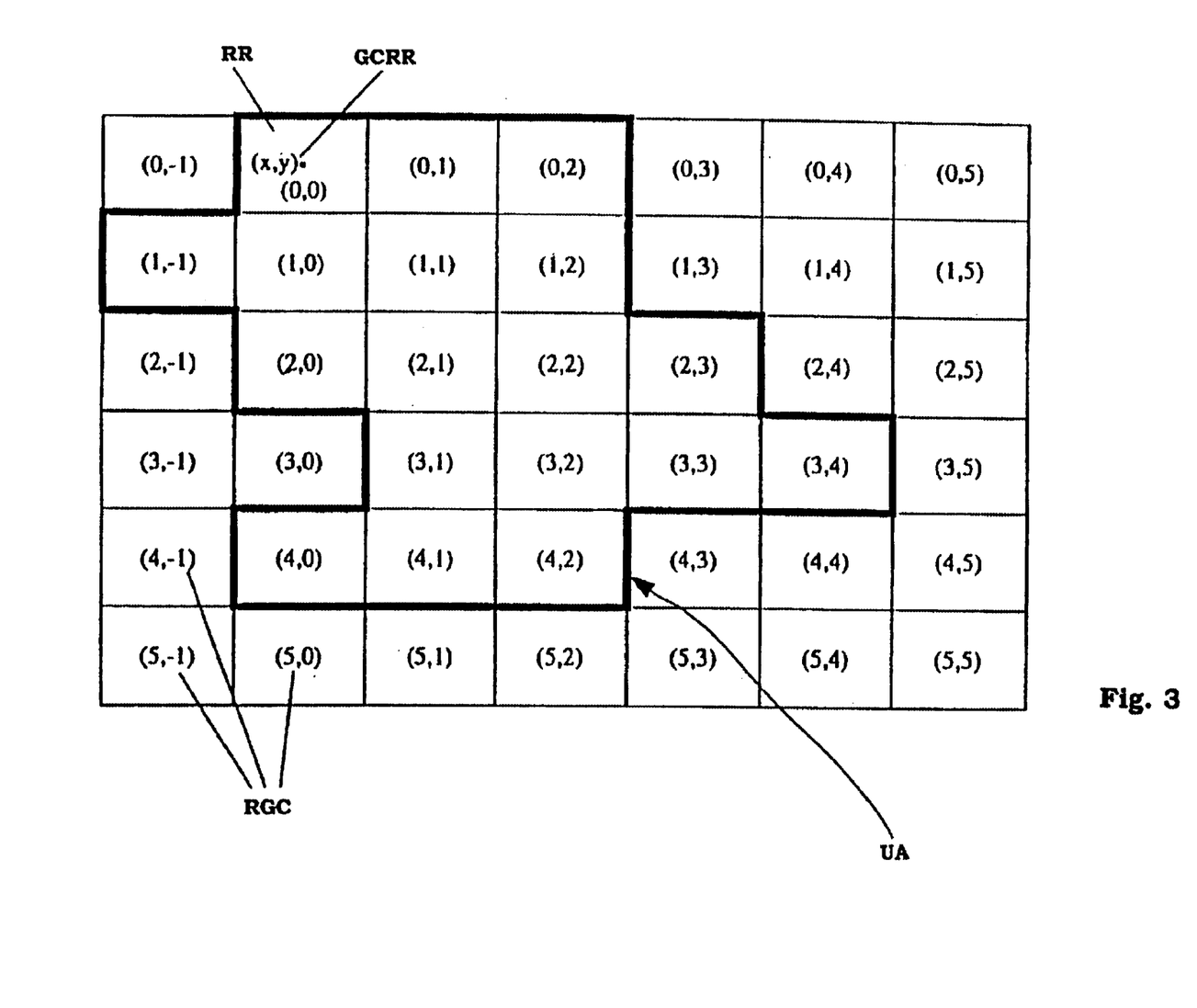
FIG. 3 shows an example of a grid pattern forming uniqueness areas according to the invention.

To achieve greater flexibility in the area shapes, many small regular shapes may be combined to an irregular shape. One way is to let many small identical shapes, for example rectangles, hexagons or triangles form a grid pattern, see FIG. 3. By combining many of the small rectangles an almost arbitrary area can be created. A simple way to do this is to specify the geographical coordinates of one of the rectangles. This rectangle, RR, forms, and is used as, a reference with the relative grid coordinate GCRR (x, y=0,0) representing for example its centre. The geographical location of the other rectangles in the grid pattern are then defined by relative grid coordinates RGC to the reference rectangle. As an example, the definition can be made row by row with the reference rectangle as the leftmost rectangle in the upper row. Then the relative coordinates of the rightmost rectangle in the upper row is specified, then the relative coordinates of the leftmost and rightmost rectangle in the second row and so forth. With reference to FIG. 3, the specification for the uniqueness area shown with thicker lines is as:

{[(x,y), (0,2)], [(1,-2), (1,2)], [(2,0), (2,3)], [(3,1), (3,4)], [(4,0), (4,2)]}

The relative row number may be omitted resulting in a shorter specification:

{[(x,y),2], [-1,2], [0,3], [1,4], [0,2]}.

In order for this scheme to function, the terminal /-s must know the size of a rectangle, i e the grid size. This can be default values that are the same in all networks or it can be transferred from the network at the initial registration, that is when the terminal registers in the network after having been turned off or outside the service area of the network, or together with the transfer of each new uniqueness area definition. The latter provides the flexibility to have different grid sizes in different parts of the network's coverage area, allowing e g for adaptation to varying population density. Another alternative is to use one and the same reference point in the whole network and use only relative grid coordinates in the uniqueness area definition. The geographical coordinates of such a single reference point could be transferred to the terminal for example when it initially registers in the network. These schemes, combining many small regular shapes into a larger irregular area, give more flexibility at the expense of longer definitions.

Turning again to FIG. 1, showing a rectangular division of the network service area, if a terminal T is registered in a uniqueness area, UA2 in this case, it is provided with a temporary identity, which is unique for that uniqueness area, by the MSN responsible for that uniqueness area, i e MSN2. MSN2 also has information regarding permanent subscriber identity. Information regarding the geographical and geometrical definition of the uniqueness areas is transferred to the terminal. When the terminal moves around in the network service area it is able to determine when it enters a new uniqueness area from the information defining the uniqueness areas together with the geographical coordinates broadcast in each cell. If the coordinates of a cell lie within a certain uniqueness area, the whole cell is considered to be inside the uniqueness area and vice versa.

When the terminal enters and performs its first location update in a new uniqueness area, the MSN in control of the cell in which the terminal is currently located (which may or may not be responsible for that uniqueness area) contacts the MSN responsible for allocating the temporary identity to the terminal in order to receive information regarding subscriber identity of the terminal. This means that all MSN's must know the address of the responsible MSN for each uniqueness area in the network. Thus all MSN's must be able to map uniqueness area identities to MSN addresses. This information is also provided to each MSN via an operation and maintenance interface or when configuring the MSN during installation.

An alternative is that the MSN contacted by the terminal contacts the MSN in which the terminal performed its previous location update (provided that the address of this MSN can be derived from the data received from the terminal) to retrieve the permanent subscriber identity. This MSN must then contact the MSN that allocated the temporary identity (if this is not the same MSN) so that the temporary identity can be unallocated. In the latter case the requirement that all MSN's should know the MSN's responsible for all uniqueness areas in the network is not applicable. In either case the MSN of the uniqueness area of which the terminal has moved into assigns a new unique temporary identity to the terminal.

Figure 4:
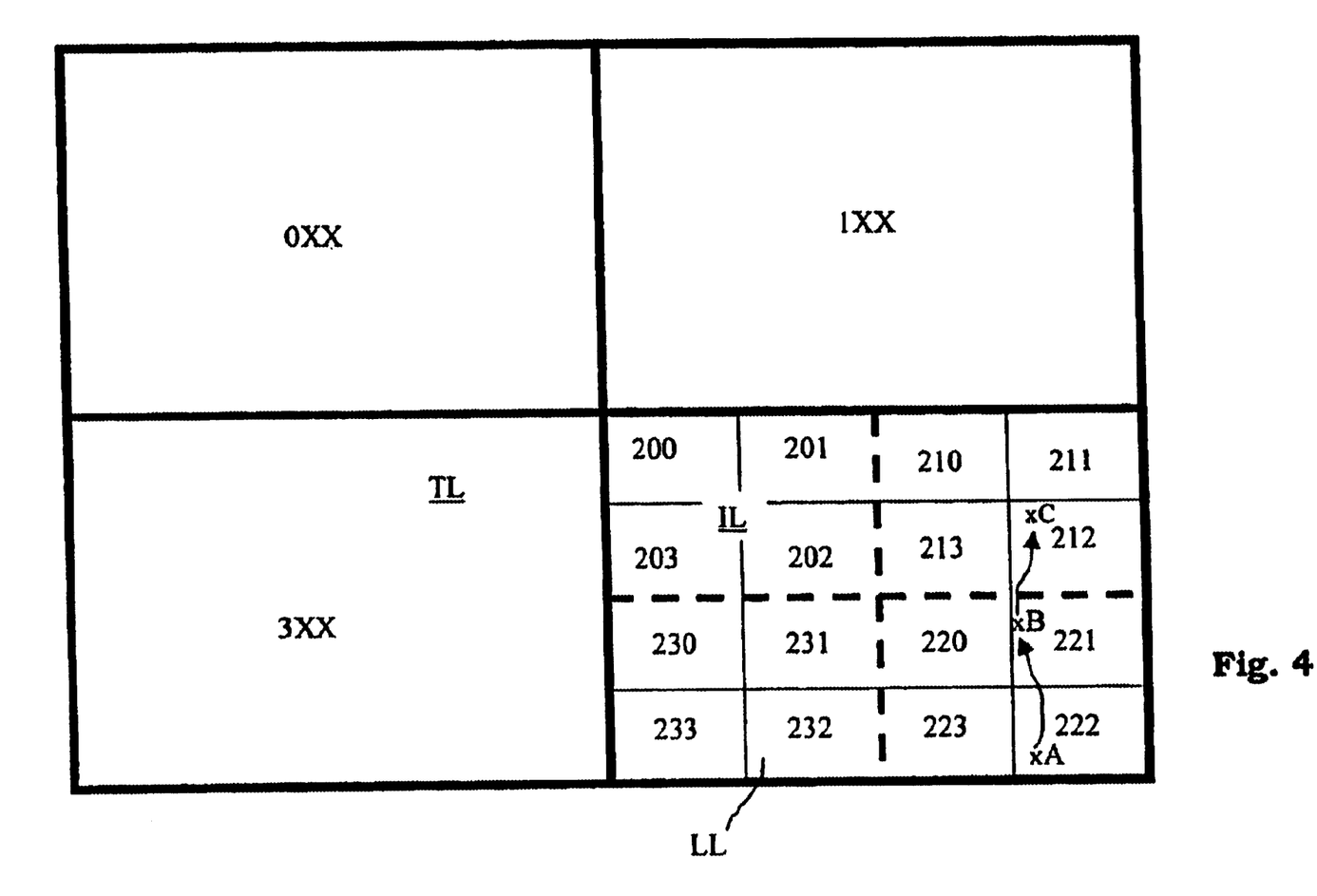
FIG. 4 is an example of a hierarchical structure of uniqueness areas.

Temporary identity uniqueness areas can be made hierarchical to scale well in large networks. Uniqueness areas are then defined on multiple levels. One example of this is shown in FIG. 4, where

| X | Position of mobile terminal |
|---|---|
| ——————— | Lowest level uniqueness area border |
| ▬ ▬ ▬ ▬ ▬ | Intermediate level uniqueness area border |
| ▬▬▬▬▬▬▬ | Top level uniqueness area border |

The temporary identity is enough to identify the terminal inside the uniqueness area where it was registered, alternatively assigned, LL. If the terminal moves to another uniqueness area, but remains in the same uniqueness area at an intermediate level, IL, (e g by moving from position A to position B), the part of the uniqueness area identity identifying the lowest level LL (i e "2") has to be used together with the temporary identity of the terminal. If the terminal then, after registering and receiving a new temporary identity in the new uniqueness area (e. g. at position B), leaves the intermediate level uniqueness area (e g by moving from position B to position C), the lowest level area identity of the uniqueness area where the new temporary identity of the terminal was received (e. g. the uniqueness area where position B is located) combined with an intermediate level prefix (i e "21") have to be used together with the temporary identity of the terminal.

On the other hand, if the terminal leaves a first uniqueness area and moves through a second uniqueness area, without registering in the second uniqueness area and consequently keeping the temporary identity received in the first uniqueness area, into a third uniqueness area belonging to another intermediate level uniqueness area (e. g. by moving from position A via position B to position C without registering at position B), the lowest level uniqueness area identity of the first uniqueness area (e. g. the uniqueness area where position A is located) combined with an intermediate level prefix (i. e."22") have to be used together with the temporary identity of the terminal and so forth. In FIG. 4 only in the top level uniqueness area with the top level prefix 2 the lower level hierarchical uniqueness area levels are shown.

As an example a hierarchical uniqueness area identity could be:

There can be an arbitrary number of hierarchical levels, just add a prefix for each hierarchical level you need.

The general idea is to keep the necessary aggregated identifier as short as possible in order to save radio resources. When the terminal initially registers in the network (after having been powered off or outside the service area of the network), it receives a temporary identity and the full uniqueness area identity together with the geographical and geometrical definitions of the uniqueness area's all hierarchical levels. When the terminal crosses a uniqueness area border only the part of the uniqueness area identity up to a certain level, together with the corresponding geographical and geometrical definitions, has to be transferred from the network.

It has to be pointed out again that all MSN's must know the address of the MSN responsible for each uniqueness area in the network. Therefore each MSN must be able to access the data necessary to translate a uniqueness area identity to the address of the MSN that is responsible for that uniqueness area.

If a terminal performs a location update in a cell (in a new uniqueness area) controlled by an MSN which is not responsible for the uniqueness area to which the cell belongs, the contacted MSN must retrieve the permanent subscriber identity and possibly other data relevant for the terminal (for example the definition of a customised location area). The permanent subscriber identity can be requested from the MSN responsible for the previous uniqueness area, which then allocates the temporary identity. The MSN responsible for the previous uniqueness area can also return the address of the MSN to which it lent the temporary identity, i e the MSN in which the terminal performed its previous location update (this may however well be the same MSN).

The other data, if any, can then be retrieved from the MSN in which the terminal performed its previous location update (which may well be the same MSN). The permanent subscriber identity can also be requested, possibly together with other data, if any, from the MSN in which the terminal performed its previous location update (provided that the address of this MSN can be derived from the data received from the terminal). This MSN must then inform the MSN which allocated the temporary identity, unless this MSN is the same MSN as the one in which the terminal performed its previous location update, so that the temporary identity can be unallocated. The MSN contacted by the terminal must then contact the MSN responsible for the concerned uniqueness area, unless this is the same MSN, and request a temporary identity. The MSN responsible for the uniqueness area then allocates a temporary identity, sends it to the requesting MSN (unless this was the same MSN) and stores the address of the MSN to which it lent the temporary identity (i.e. the requesting MSN), to be able to direct future requests concerning that particular terminal.

If a terminal performs a location update in a cell (in the same uniqueness area as the terminal was already registered in, and in which its temporary identity was allocated) controlled by a MSN which is not responsible for the uniqueness area to which the cell belongs, the contacted MSN must in turn contact the MSN responsible for the uniqueness area (or possibly only the MSN in which the terminal performed its previous location update, provided that the address of this MSN can be derived from the data received from the terminal) to request translation of the temporary identity and to have the permanent subscriber identity returned. The MSN contacted by the terminal may then also have to contact the MSN in which the terminal performed its previous location update to get relevant data transferred. The address of this MSN can be retrieved (together with the permanent subscriber identity) from the MSN in control of the uniqueness area or, possibly, the address can be derived from the data received from the terminal.

The geometrical definition of the uniqueness areas is set by the operator of the network, and is fixed. This does not however mean that it is ultimately fixed. The operator may change the geometrical and/or geographical definition of the uniqueness areas depending on different circumstances such as the density of terminals in different parts of the network, but always with the criteria that each uniqueness area is controlled by one MSN.

In this context it is conceivable that all MSN's together change the form/size/location of the uniqueness areas dynamically through an adaptive process based on parameters such as the average density of terminals in different areas and with some specific protocol between the MSN's.

It is to be understood that the embodiment described above and shown in the drawings is to be considered as illustrative and not restricting and may be embodied in other specific forms without departing form the scope of the invention as claimed in the appended patent claims.

What is claimed is:

1. A method of assigning temporary identities to terminals connected to a communication network, the communication network comprising base-stations and cells forming a geographic network service area with a plurality of location areas, the method comprising:

dividing the geographic network service area into a plurality of uniqueness areas independently of, and without relation to, the plurality of location areas of the network;

controlling each uniqueness area of the plurality of uniqueness areas by a mobile serving node, each mobile serving node being responsible for a plurality of cells; and assigning by the mobile serving node, to a terminal registering in a uniqueness area of the plurality of uniqueness areas, a temporary identity, the temporary identity being unique to the uniqueness area, and the assigning mobile serving node being responsible for the uniqueness area.

2. The method according to claim 1, wherein the plurality of uniqueness areas fully cover the geographic network service area and do not overlap each other.

3. The method according to claim 2, wherein a shape of at least one of the plurality of the uniqueness areas is defined by a geometrical shape.

4. The method according to claim 3, wherein geographic coordinates broadcast in at least one of the plurality of cells are used to define at least one of the uniqueness areas.

5. The method according to claim 4, wherein a geographical and geometrical definition of the uniqueness area of the plurality of uniqueness areas is transferred to the terminal.

6. The method according to claim 1, wherein, when the terminal passes a border between the uniqueness area and a neighbouring uniqueness area and registers In the neighbouring uniqueness area, a neighboring-uniqueness-area mobile serving node receives information regarding the terminal from the mobile serving node.

7. The method according to claim 6, wherein:

the neighbouring uniqueness area assigns a second temporary identity to the terminal in response to the terminal entering the neighbouring uniqueness area, unless the temporary identity is available in the neighbouring uniqueness area; and the temporary identity and the second temporary identity are unique relative to one another.

8. The method according to claim 1, wherein:

at least two of the plurality of uniqueness areas form hierarchical overlapping levels of geographical uniqueness areas; and the temporary identity is added with an identifier in response to the terminal entering a new uniqueness area, the identifier comprising an identification of the uniqueness area.

9. The method according to claim 8, wherein a prefix is added to the temporary identity.

10. The method according to claim 8, wherein parts of the added identifier that represent uniqueness area levels that have not changed are excluded from the added identifier.

11. A method of assigning temporary identities to terminals connected to a communication network, the communication network comprising base-stations and cells forming a geographic network service area with a plurality of location areas, the method comprising:

dividing the geographic network service area into a plurality of uniqueness areas that fully cover the geographic network service area and do not overlap each other, wherein a shape of at least one of the plurality of uniqueness areas is defined by a geometrical shape, and wherein the dividing step includes the steps of:

broadcasting geographic coordinates in at least one of the plurality of cells to define at least one of the uniqueness areas;

creating at least one uniqueness area of the plurality of uniqueness areas via a grid pattern of regular shapes; and combining a set of the shapes to form and define an irregular area;

controlling each uniqueness area of the plurality of uniqueness areas by a mobile serving node, each mobile serving node being responsible for a plurality of cells;

assigning by the mobile serving node, to a terminal registering in a uniqueness area of the plurality of uniqueness areas, a temporary identity, the temporary identity being unique to the uniqueness area, the assigning mobile serving node being responsible for the uniqueness area; and wherein the step of dividing the geographic network service area into the plurality of uniqueness areas is performed independently of, and without relation to, the plurality of location areas of the network.

12. The method according to claim 11, wherein, the step of creating at least one uniqueness area of the plurality of uniqueness areas via a grid pattern of regular shapes includes the steps of:

defining a reference point utilizing specific geographic coordinates; and specifying shapes included in the at least one uniqueness area utilizing relative coordinates in relation to the defined reference point.

13. The method according to claim 11, wherein the step of creating at least one uniqueness area of the plurality of uniqueness areas via a grid pattern of regular shapes includes the steps of:

defining a single geographical reference point issue for the whole network area utilizing specific geographic coordinates; and defining a plurality of the plurality of uniqueness areas utilizing relative coordinates in relation to the defined reference point for the whole network area.

14. The method according to claim 11, wherein, in response to the terminal registering, a grid size is transmitted to the terminal.

15. The method according to claim 11, wherein, in response to the terminal registering, a grid size and a uniqueness area definition are transmitted to the terminal.

16. The method according to claim 1, wherein a single mobile serving node is responsible for the assignment of the first temporary identity in the uniqueness area.

17. The method according to claim 1, wherein a dedicated temporary identity server, and not a mobile serving node, is used for assignment of temporary identities.

18. A method of assigning temporary identities to terminals connected to a communication network, the communication network comprising base-stations and cells forming a geographic network service area with a plurality of location areas, the method comprising:

dividing the geographic network service area into a plurality of uniqueness areas independently of, and without relation to, the plurality of location areas of the network;

controlling each uniqueness area of the plurality of uniqueness areas by a mobile serving node, each mobile serving node being responsible for a plurality of cells;

assigning by the mobile serving node, to a terminal registering in a uniqueness area of the plurality of uniqueness areas, a temporary identity, the temporary identity being unique to the uniqueness area, the assigning mobile serving node being responsible for the uniqueness area;

creating a long term adapted location area, the long term adapted location area being adapted to a long term mobility pattern of a user of the terminal;

determining a type of communication between the terminal and the network;

entering the terminal and the network into a mode corresponding to the determined communication type; and creating different adapted location areas depending on a geographical location of the terminal, movements of the terminal in the network, and the entered mode.

19. A system for assigning temporary identities to terminals connected to a communication network, said system comprising:

a plurality of base-stations;

a plurality of cells forming a geographic network service area;

means for creating a plurality of location areas in the geographic network service area;

means for dividing the geographic network service area into a plurality of uniqueness areas, said means for dividing being adapted to divide the geographic network service area into the plurality of uniqueness areas of independently of, and without relation to the plurality of location areas of the network;

a plurality of mobile serving nodes, each mobile serving node being responsible for at least one of the plurality of cells, and each of the mobile serving nodes including;

means for controlling one of the uniqueness areas of the plurality of uniqueness areas; and means for generating a temporary identity in response to a terminal registering in the uniqueness area controlled by the mobile serving node, said temporary identity being transferred to the terminal and being unique to the uniqueness area controlled by the mobile serving node.

20. The system according to claim 19, wherein: the means for dividing is adapted to broadcast in the plurality of cells, a uniqueness area definition comprising geographical coordinates and data defining a geometrical shape of the uniqueness area.

21. The system according to claim 20, wherein the terminal comprises means for comparing the uniqueness area definition with the coordinates broadcast in the plurality of cells so as to be able to locate a position of the terminal in relation to the uniqueness area.

* * * * *